(12) United States Patent
Kim et al.

(10) Patent No.: US 8,837,423 B2
(45) Date of Patent: Sep. 16, 2014

(54) APPARATUS AND METHOD FOR TRANSMITTING/RECEIVING DATA IN A COMMUNICATION SYSTEM

(75) Inventors: Dong-Ho Kim, Seoul (KR); Jong-Hyung Kwun, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1171 days.

(21) Appl. No.: 11/985,958

(22) Filed: Nov. 19, 2007

(65) Prior Publication Data

US 2008/0117878 A1    May 22, 2008

(30) Foreign Application Priority Data

Nov. 17, 2006   (KR) .................... 10-2006-0114012

(51) Int. Cl.
*H04W 4/00* (2009.01)
*H04W 36/00* (2009.01)
*H04W 36/02* (2009.01)
H04W 36/08 (2009.01)
H04W 88/08 (2009.01)

(52) U.S. Cl.
CPC .............. *H04W 36/02* (2013.01); *H04W 36/00* (2013.01); *H04W 36/08* (2013.01); *H04W 88/08* (2013.01)

USPC .......................................... 370/331; 455/439

(58) Field of Classification Search
CPC ............ H04W 36/00; H04W 36/0005; H04W 36/0016
USPC ........................................ 455/439; 370/332
See application file for complete search history.

(56) References Cited

U.S. PATENT DOCUMENTS

2004/0185853 A1    9/2004   Kim et al.

FOREIGN PATENT DOCUMENTS

KR    10-2003-0029546    4/2003
KR    10-2004-0079659    9/2004

OTHER PUBLICATIONS

Office Action dated Oct. 30, 2009 in connection with Korean Patent Application No. 10-2006-0114012.

*Primary Examiner* — Afshawn Towfighi

(57) ABSTRACT

An apparatus and method for transmitting and receiving data in a communication system are provided. A serving node includes a transceiver/receiver including an antenna for transmitting and receiving data from at least one of plurality of customer equipments; a control processor responsive to an requesting handover message indicating handover to a target node for transmitting to the target node a sequence number message wherein the sequence number message has successfully received by the customer equipment; a memory for storing data to be transmitted to the customer equipment.

21 Claims, 3 Drawing Sheets

APPARATUS AND METHOD FOR TRANSMITTING/RECEIVING DATA IN A COMMUNICATION SYSTEM

CROSS-REFERENCE TO RELATED APPLICATION(S) AND CLAIM OF PRIORITY

The present application claims the benefit under 35 U.S.C. §119(a) of a Korean Patent Application filed in the Korean Intellectual Property Office on Nov. 17, 2006 and assigned Serial No. 2006-114012, the entire disclosure of which is hereby incorporated by reference.

TECHNICAL FIELD OF THE INVENTION

The present invention generally relates to a communication system. More particularly, the present invention relates to an apparatus and method for transmitting/receiving data in a communication system

BACKGROUND OF THE INVENTION

In general, future-generation communication systems are under development to provide data at high rates to mobile stations, ensuring mobility for the mobile stations. They are also able to provide services with a variety of Quality of Service (QoS) requirements to the mobile stations.

Among the services, real-time services such as Voice over Internet Protocol (VoIP) or gaming service are sensitive to service delay and thus have large limitations.

Especially when a mobile station in a handover zone receives a voice packet service or a gaming service from a base station, it may not receive service data because it is in a poor channel status. In this case, the mobile station requests retransmission of the service data to the base station and the base station should retransmit the service data.

As described above, when the mobile station is in the handover zone, there is a high probability that errors occur during data transmission/reception, resulting in data loss. To reduce the information loss, error control schemes are used, thus increasing system reliability. A major error control scheme is Hybrid Automatic Repeat reQuest (HARQ).

With reference to FIG. 1, the configuration of a typical communication system will be described.

FIG. 1 illustrates the configuration of a typical communication system.

Referring to FIG. 1, the communication system is Universal Mobile Telecommunication System (UMTS). It includes a core network (CN) 100, a plurality of radio network subsystems 110 and 120, and a user equipment (UE) 130. The radio network subsystem (RNS) 110 and RNS 120 include radio network controllers 111 and 112 and a plurality of Node Bs 105, 107, 109 and 111. For example, the RNS 110 has the radio network controller (RNC) 111 and the Node Bs 113 and 115, and the RNS 130 has the RNC 112 and the Node Bs 114 and 116.

The CN 100 provides connectivity between networks. The RNC 111 and RNC 112 each control at least one Node B and the Node B communicates with the UE 130 on a radio channel.

With reference to FIG. 2, a description will be made of a data transmission and reception operation when a user equipment (UE) enters a handover zone during data transmission to, and reception from, a serving Node B in the communication system.

FIG. 2 is a diagram illustrating a signal flow for a data transmission and reception operation when a UE enters a handover zone during data transmission to, and reception from, a serving Node B in the communication system.

Referring to FIG. 2, a radio network controller (RNC) generates data in the form of packet data units (PDUs) and assigns a sequence number to each PDU. It is assumed that the data is real-time data such as those of a gaming service or a voice service. The RNC transmits a PDU with a sequence number k, PDU #k to the serving Node B in step 201. The serving Node B transmits PDU #k and resource information to the UE in step 203. The resource information is information about the packet transmission scheme or the transport format of the data, or allocation information about the position and size of physical resources that carry the data.

In step 205, the UE transmits an ACKnowledgment (ACK) message to the serving Node B, notifying successful reception of PDU #k.

The RNC then transmits a PDU with a sequence number k+1, PDU #k+1, to the serving Node B in step 207. The serving Node B transmits PDU #k+1 and resource information to the UE.

On the assumption that the UE has moved to a handover zone that is under a poor channel status and thus that has neighbor cell interference, the UE fails to receive PDU #k+1 in step 209. In step 211, the UE transmits a Negative ACK (NACK) message to the serving Node B, indicating the reception failure of PDU #k+1.

Meanwhile, if the UE determines that a handover to a target Node B is required, taking into account the received signal levels of the serving Node B and neighbor Node Bs around the time of step 211 in step 240, it transmits a handover request message to the serving Node B or the target Node B. In the present invention, it is assumed that the UE transmits the handover request message to the serving Node B in step 213. Then the serving Node B transmits the handover request message to the target Node B in step 215.

For the NACK message received from the UE in step 211, the serving Node B retransmits PDU #k+1 and the resource information to the UE in step 219. If the UE fails to receive PDU #k+1 or the resource information, it transmits a NACK message to the serving Node B, indicating the reception failure of PDU #k+1 in step 221.

Meanwhile, the target Node B negotiates about the handover with the serving Node B and the RNC in step 217. During the negotiation, the target Node B decides as to whether to accept the handover of the UE. If determining to accept the handover, the target Node B requests the serving Node B to transmit the sequence numbers of PDUs that the UE has successfully received so far and the sequence numbers of buffered PDUs to be transmitted to the UE by a Radio Link Protocol (RLP) state request message in step 227.

Upon receipt of the NACK message in step 221, the serving Node B retransmits PDU #k+1 and the resource information to the UE, despite reception of the RLP state request message in step 223.

While not shown, the serving Node B can obviously transmit a new PDU to the UE before receiving the RLP state request message from the target Node B.

When receiving the RLP state request message, the serving Node B retransmits PDU #k+1 up to a maximum number of transmission times and transmits a response for the RLP state request message.

In the illustrated case of FIG. 2, the UE has successfully received PDU #k+1 and the resource information before the maximum number of transmission times is reached. Therefore, the UE transmits an ACK message to the serving Node B, indicating the successful reception of PDU #k+1 or the resource information in step 225.

Upon receipt of the ACK message, the serving Node B transmits the sequence numbers of the PDUs transmitted to the UE so far and the sequence numbers of the buffered PDUs for the UE to the target Node B by an RLP state response message in step 229.

As described above, when the UE is located in the handover zone, it is placed in a poor channel status or affected by neighbor cell interference. Therefore, data retransmission occurs a plurality of times until successful reception of data in the UE. The handover negotiation is not completed until the serving Node B receives the ACK message for PDU #k+1. Hence, the handover procedure takes a long time.

While not shown in FIG. 2, if the UE fails to decode data even though the serving Node B retransmits the data up to the maximum number of transmission times, the UE transmits a NACK message to the BS after the last retransmission. Subsequently, the serving Node B transmits the sequence numbers of the PDUs transmitted to the UE so far and the sequence numbers of the buffered PDUs for the UE to the target Node B by an RLP state response message. Clearly, the buffered PDUs include PDU #k+1.

As a consequence, the handover procedure takes much time, and additional transmission of PDU #k+1 from the RNC to the target Node B and additional transmission of PDU #k+1 from the target Node B to the UE involving coding and modulation further increase the handover time and a transmission delay considerably.

After receiving the RLP state response message, the target Node B receives PDU #k+2 from the RNC in step 231 and transmits PDU #k+2 and resource information to the UE in step 233. Then the UE transmits an ACK message for PDU #k+2 to the target Node B in step 235.

As described above, when the UE is in the handover zone, there is a high probability of data loss during data transmission from the serving Node B to the UE. Thus, the serving Node B should retransmit the lost data to the UE. However, there is no specified method for preventing unnecessary data retransmission.

SUMMARY OF THE INVENTION

To address the above-discussed deficiencies of the prior art, it is a primary aspect of exemplary embodiments of the present invention to address at least the problems and/or disadvantages and to provide at least the advantages described below. Accordingly, an aspect of exemplary embodiments of the present invention is to provide an apparatus and method for transmitting and receiving data to reduce data loss by controlling a Modulation and Coding Scheme (MCS) during handover in a communication system.

An aspect of exemplary embodiments of the present invention provides an apparatus and method for transmitting and receiving data by achieving a diversity gain through allocation of extra resources during handover so as to reduce an error probability and increase the reception reliability of data in a communication system.

In accordance with an aspect of exemplary embodiments of the present invention, there is provided a method for transmitting and receiving data in a serving Node B in a communication system, in which a first message requesting a handover is received from a UE, the first message is transmitted to a target Node B, a second message requesting sequence numbers of data that the UE has successfully received from the serving Node B is received from the target Node B, and a third message including the sequence numbers of data that the UE has successfully received from the serving Node B is transmitted to the target Node B, in response to the second message.

In accordance with another aspect of exemplary embodiments of the present invention, there is provided an apparatus for transmitting and receiving data in a communication system, in which a serving Node B receives a first message requesting a handover from a UE, transmits the first message to a target Node B, receives from the target Node B a second message requesting sequence numbers of data that the UE has successfully received from the serving Node B, and transmits to the target Node B a third message including the sequence numbers of data that the UE has successfully received from the serving Node B, in response to the second message.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

Figure 1:
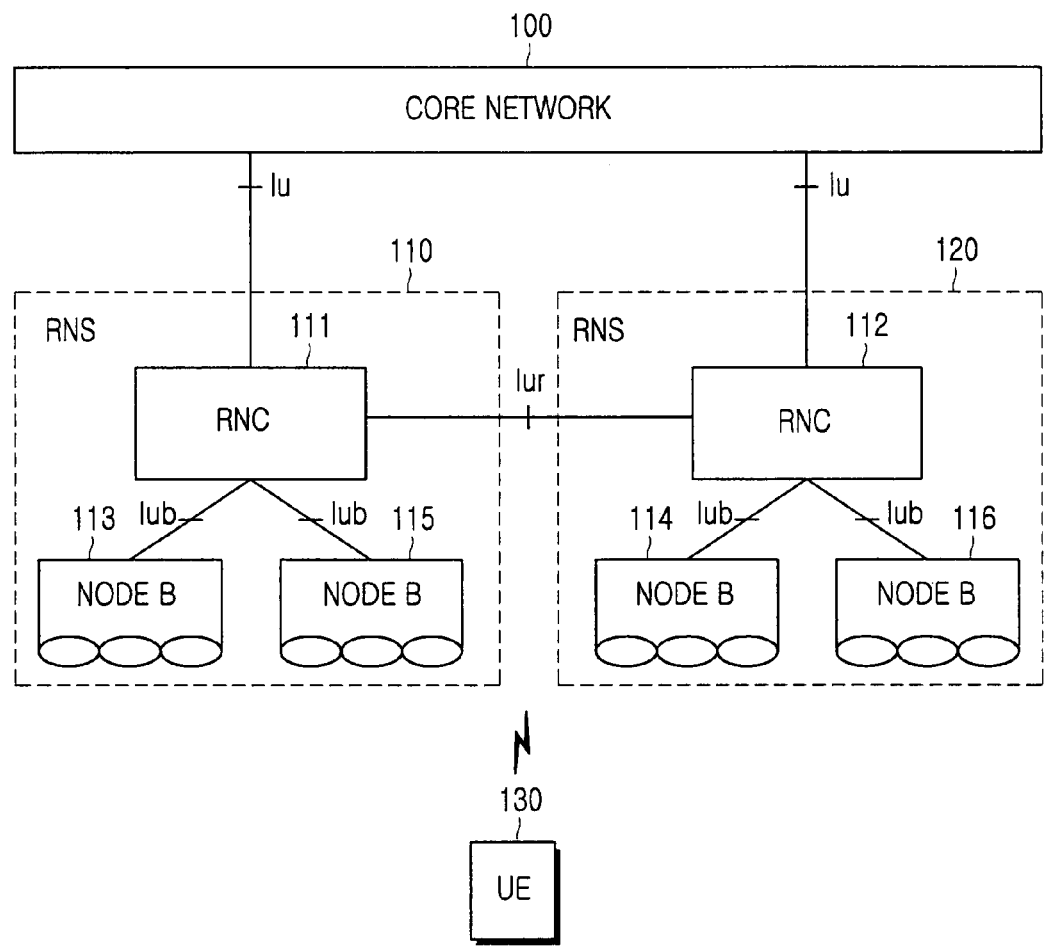
FIG. 1 illustrates the configuration of a typical communication system.
Figure 2:
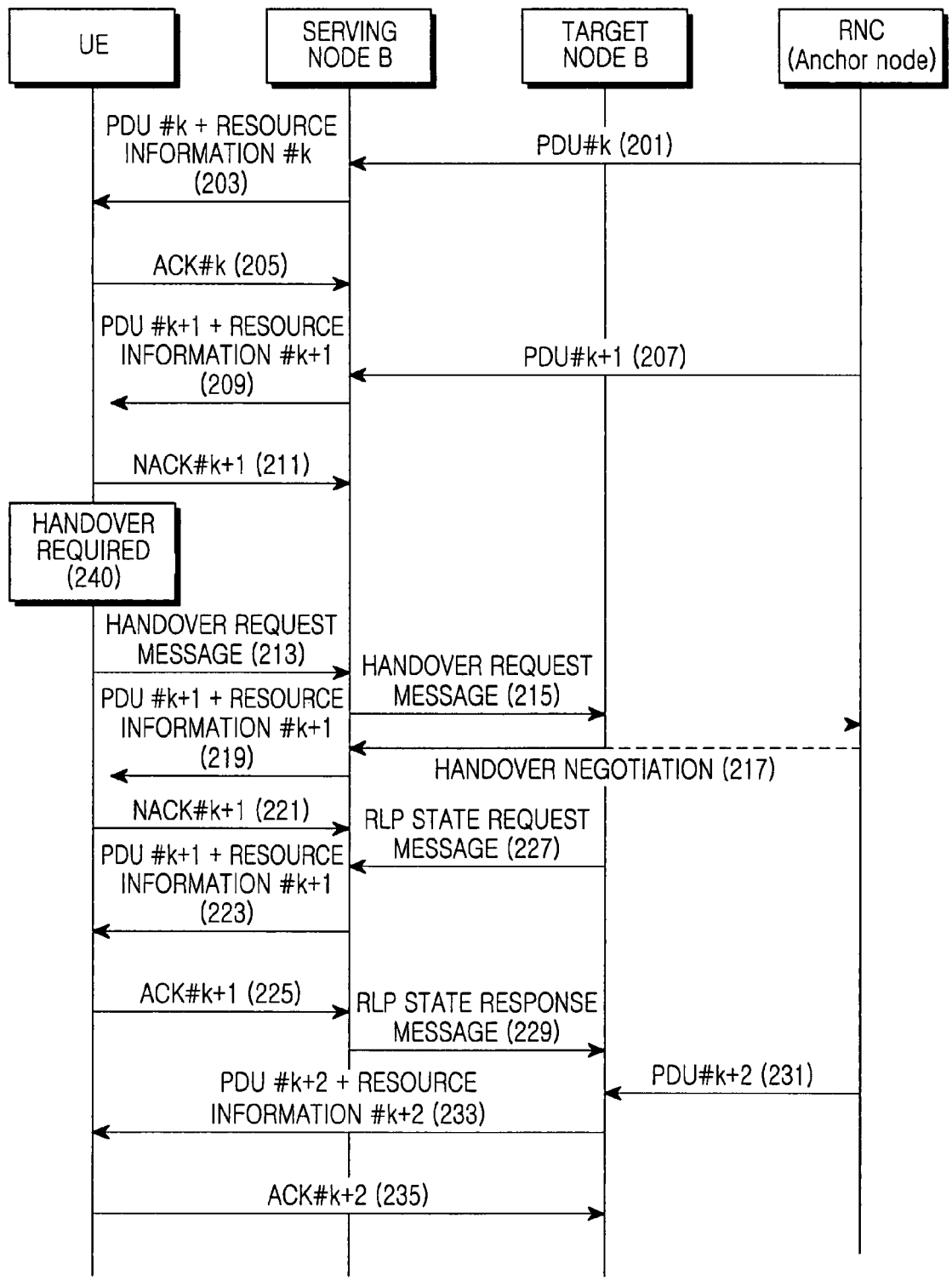
FIG. 2 is a diagram illustrating a signal flow for a data transmission/reception operation when a UE enters a handover zone during data transmission/reception to/from a serving Node B in the communication system.
Figure 3:
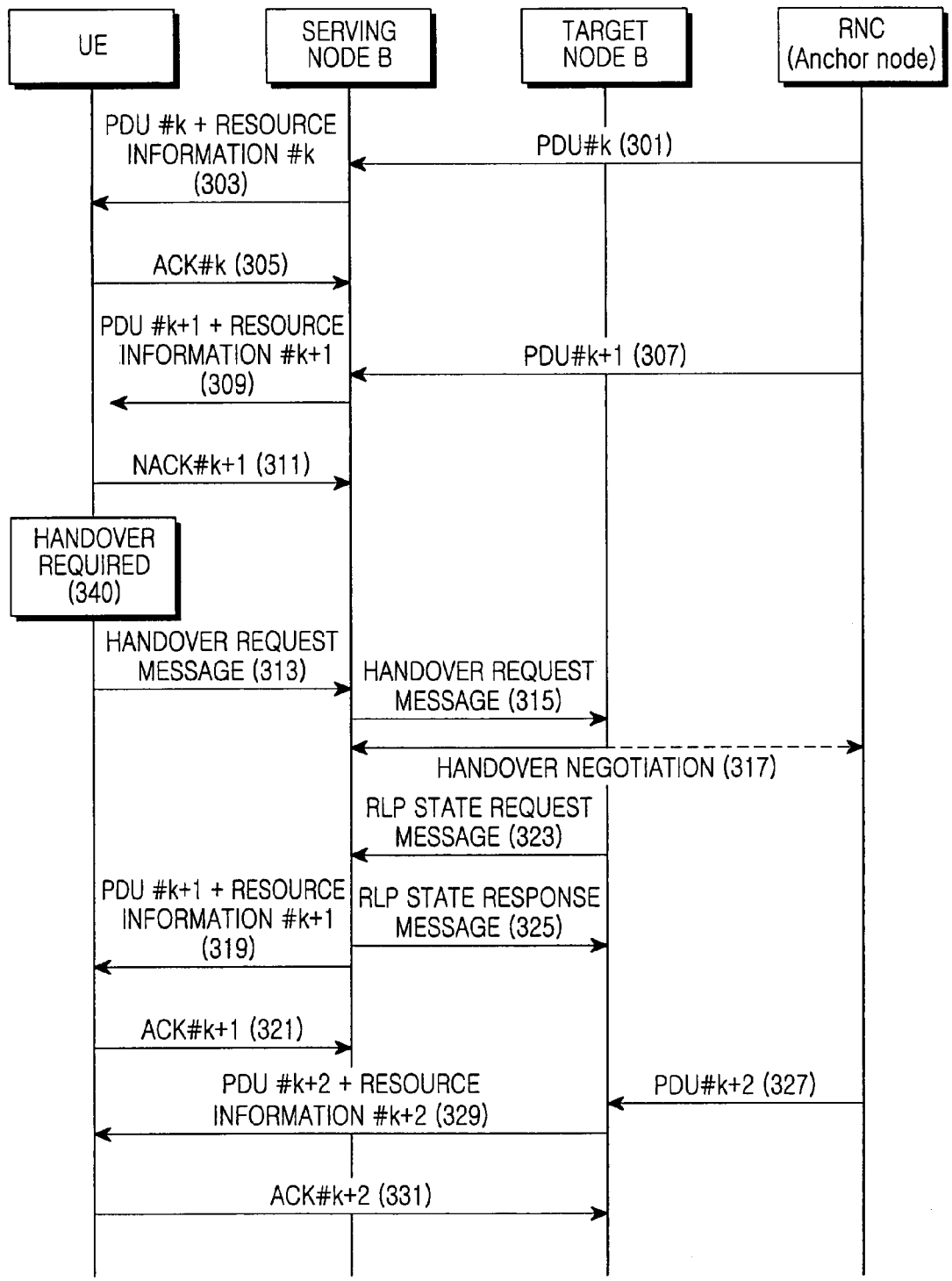
FIG. 3 is a diagram illustrating a signal flow for a data transmission/reception operation when a UE enters a handover zone during data transmission/reception to/from a serving Node B in a communication system according to an exemplary embodiment of the present invention.

FIG. 3, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication system.

Exemplary embodiments of the present invention provide an apparatus and method for transmitting and receiving data by controlling a modulation and coding scheme (MCS) level in a communication system. The exemplary embodiments of the present invention provide an apparatus and method for transmitting and receiving data, in which an MCS level is controlled or extra resources are allocated to prevent unnecessary data retransmission during data transmission/reception in a handover zone. Therefore, the handover is performed with an increased reception reliability of data in a user equipment (UE), a decreased error probability, and a satisfied delay requirement. The present invention is described in the context of Voice over Internet Protocol (VoIP) service data.

With reference to FIG. 3, a description will be made of a data transmission and reception operation when a UE enters into a handover zone during data transmission/reception between the UE and a serving Node B in a communication system according to an exemplary embodiment of the present invention.

FIG. 3 is a diagram illustrating a signal flow for a data transmission and reception operation when a UE enters a handover zone during data transmission to, and reception from, a serving Node B in a communication system according to an exemplary embodiment of the present invention.

Referring to FIG. 3, a radio network controller (RNC) generates data in the form of PDUs and assigns a sequence number to each PDU. The RNC transmits a PDU with a sequence number k, PDU #k to the serving Node B in step 301.

The serving Node B transmits PDU #k and resource information to the UE in step 303. The resource information is information about the packet transmission scheme or the transport format of the data, or allocation information about the position and size of physical resources that carry the data.

In step 305, the UE transmits an ACK message to the serving Node B, indicating successful reception of PDU #k.

The RNC then transmits a PDU with a sequence number k+1, PDU #k+1 to the serving Node B in step 307. The serving Node B transmits PDU #k+1 and resource information to the UE.

On the assumption that the UE has moved to a handover zone that is under a poor channel status and thus that has neighbor cell interference, the UE fails to receive PDU #k+1 or the resource information in step 309. In step 311, the UE transmits a NACK message to the serving Node B, indicating the reception failure of PDU #k+1.

While not shown, it may occur that the UE successfully receives PDU #k+1 from the serving Node B and transmits an ACK message for PDU #k+1 to the serving Node B in step 311.

Meanwhile, if the UE determines that a handover to a target Node B is required, taking into account the received signal levels of the serving Node B and neighbor Node Bs around the time of step 311 in step 340, it transmits a handover request message to the serving Node B or the target Node B in step 313. In the present invention, it is assumed that the UE transmits the handover request message to the serving Node B in step 313. Then the serving Node B transmits the handover request message to the target Node B in step 315.

Upon receipt of the handover request message, the target Node B negotiates about the handover with the serving Node B and the RNC in step 317. During the negotiation, the target Node B decides as to whether to accept the handover of the UE. If determining to accept the handover, the target Node B requests the serving Node B to transmit the sequence numbers of PDUs that the UE has successfully received so far by an RLP state request message in step 323.

In step 325, the serving Node B transmits to the target Node B an RLP state response message for the RLP state request message irrespective of ACK/NACK transmission or retransmission concerning data transmitted from the serving Node B to the UE.

The RLP state response message includes the sequence numbers of PDUs that the serving Node has transmitted to the UE so far.

Aside from the handover negotiations among the serving Node B, the target Node B, and the RNC, the serving Node B determines that data retransmission is required because it has received the NACK message for PDU #k+1 from the UE in step 311.

Thus, the serving Node B uses a lower MCS level than before the handover or allocates additional radio resources with the same MCS level, so as to enable the UE to successfully receive the retransmitted data.

Herein, control of an MCS level means that if the MCS level of data received from the serving Node B is 5 before the UE determines that the handover is required, the serving Node B transmits data at a lower MCS level than MCS level 5.

For example, if MCS level 1 to MCS level 10 are available, MCS level 1 represents the lowest coding rate and the lowest modulation order and MCS level 10 represents the highest coding rate and the highest modulation order. Therefore, a lower MCS level is equivalent to a lower data rate and a higher transmission and reception reliability for information data, whereas a higher MCS level is equivalent to a higher data rate and a lower transmission and reception reliability for information data.

If the serving Node B transmits data at MCS level 1 to the UE before the UE recognizes the need for a handover, it cannot further lower the MCS level. Therefore, the serving Node B encodes and modulates data at the same MCS level and repeats the modulated data in different frequency areas, or using different codes, or in different spatial areas, prior to transmission.

In step 319, the serving Node B retransmits PDU #k+1 and the resource information to the UE. To indicate that a lower MCS level has been applied to PDU #k+1, MCS level change information may be transmitted on an allocation information control channel such as a Forward Link Assignment Block (FLAB).

The UE then transmits an ACK message for PDU #k+1 to the serving Node B in step 321.

If the UE has succeeded in receiving PDU #k+1 in step 311, it is obvious that steps 319 and 321 are not performed.

While not shown, the UE can receive a new PDU until before the serving Node B receives the RLP state request message from the target Node B.

In step 325, the serving Node B transmits to the target Node B an RLP state response message for the RLP state request message irrespective of ACK/NACK transmission or retransmission concerning data transmitted from the serving Node B to the UE. Consequently, the handover procedure takes less time, thus enabling a fast handover.

Upon receipt of the RLP state response message, the target Node B receives PDU #k+2 from the RNC in step 327 and transmits PDU #k+2 and resource information to the UE in step 329. The UE then transmits an ACK message for PDU #k+2 to the target Node B in step 331.

As is apparent from the above description, during data transmission/reception in a handover zone, a serving Node B applies a lower MCS level or allocates extra resources to transmission data before a handover, thereby increasing reception reliability. Since the time required for handover negotiations is decreased, a handover delay is reduced and the number of retransmissions is decreased by use of a high-reliability transmission and reception scheme. As a consequence, the time delay of data transmission and reception is reduced.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A serving node apparatus for communicating with at least one of a plurality of customer equipments, comprising:
　a transceiver comprising an antenna configured to transmit and receive data from at least one of a plurality of customer equipments;
　a control processor configured to, in response to a requesting handover message indicating handover to a target node, transmit to the target node a sequence number message, wherein the sequence number message was successfully received by the at least one customer equipment; and
　a memory configured to store data to be transmitted to the at least one customer equipment,
　wherein after receiving the requesting handover message, the transceiver transmits the data to the at least one customer equipment at a lower Modulation and Coding Scheme (MCS) level than before receiving the requesting handover message, the lower MCS level having a lower coding rate and a lower modulation order, and
　wherein if a lowest MCS level is used for transmitting the data before receiving the requesting handover message, the control processor allocates additional resources for transmitting the data and the transceiver transmits the data using the additional resources at the same MCS level as before receiving the requesting handover message.

2. The apparatus of claim 1, wherein the requesting handover message receives from the at least one customer equipment.

3. The apparatus of claim 1, further the control processor for transmitting the requesting handover message to the target node and receiving from the target node the sequence numbers of data that the at least one customer equipment successfully received from the serving node.

4. The apparatus of claim 1, wherein the data is voice packet data.

5. The apparatus of claim 1, wherein the serving Node transmits MCS level change information, when the data is transmitted at the lower MCS level than before receiving the requesting handover message.

6. The apparatus of claim 1, wherein if the data is to be transmitted at the same MCS level as before receiving the requesting handover message, the serving Node encodes and modulates the data at the same MCS level as before receiving the requesting handover message, repeats the modulated data in a plurality of frequency areas, and transmits the repeated data.

7. The apparatus of claim 1, wherein if the data is to be transmitted at the same MCS level as before receiving the requesting handover message, the serving Node encodes and modulates the data at the same MCS level as before receiving the requesting handover message, repeats the modulated data using a plurality of different codes, and transmits the repeated data.

8. The apparatus of claim 1, wherein if the data is to be transmitted at the same MCS level as before receiving the requesting handover message, the serving Node encodes and modulates the data at the same MCS level as before receiving the requesting handover message, repeats the modulated data in a plurality of different spatial areas, and transmits the repeated data.

9. A method for transmitting and receiving data in a serving Node in a communication system, comprising:
　receiving a first message requesting a handover from a customer equipment;
　storing the received first message in a memory;
　transmitting, responsive to the first message indicating handover to a target node, to the target node, a second message including the sequence numbers of data that were successfully received by the customer equipment;
　in the presence of data to be transmitted to the customer equipment after receiving the first message, transmitting the data at a lower Modulation and Coding Scheme (MCS) level than before receiving the first message, the lower MCS level having a lower coding rate and a lower modulation order; and
　if the lowest MCS level is used for transmitting the data before receiving the requesting handover message, allocating additional resources for transmitting the data and transmitting the data using the additional resources at the same MCS level as before receiving the requesting handover message.

10. The method of claim 9, further comprising transmitting the first message to the target node and receiving from the target node the sequence numbers of data that the customer equipment successfully received from the serving node.

11. The method of claim 9, wherein the data is voice packet data.

12. The method of claim 9, further comprising transmitting MCS level change information, when the data is transmitted at the lower MCS level than before receiving the first message.

13. The method of claim 9, wherein if the data is to be transmitted at the same MCS level as before receiving the first message, the data transmission comprises encoding and modulating the data at the same MCS level as before receiving the first message, repeating the modulated data in a plurality of different frequency areas, and transmitting the repeated data.

14. The method of claim 9, wherein if the data is to be transmitted at the same MCS level as before receiving the first message, the data transmission comprises encoding and modulating the data at the same MCS level as before receiving the first message, repeating the modulated data using a plurality of different codes, and transmitting the repeated data.

15. The method of claim 9, wherein if the data is to be transmitted at the same MCS level as before receiving the first message, the data transmission comprises encoding and modulating the data at the same MCS level as before receiving the first message, repeating the modulated data in a plurality of different spatial areas, and transmitting the repeated data.

16. A wireless network capable of communicating with user equipment, the wireless network comprising:
　a serving Node B configured to communicate with a first user equipment; and
　a target Node B configured to communicate with the first user equipment,
　wherein the serving Node B receives a first message requesting a handover from the user equipment, transmits the first message to a target Node B, and receives from the target Node B a second message requesting sequence numbers of data that the first user equipment has successfully received from the serving Node B;

wherein the serving Node B transmits to the target Node B a third message including the sequence numbers of data that the first user equipment has successfully received from the serving Node B, in response to the second message;

wherein in the presence of data to be transmitted to the first user equipment after receiving the first message, the serving Node B transmits the data at a lower Modulation and Coding Scheme (MCS) level than before receiving the first message, the lower MCS level having a lower coding rate and a lower modulation order; and wherein if the lowest MCS level is used for transmitting the data before receiving the requesting handover message, the serving Node B allocates additional resources for transmitting the data and transmits the data using the additional resources at the same MCS level as before receiving the requesting handover message.

17. The wireless network of claim 16, wherein the data is voice packet data.

18. The wireless network of claim 16, wherein the serving Node B transmits MCS level change information, when the data is transmitted at the lower MCS level than before receiving the first message.

19. The wireless network of claim 16, wherein if the data is to be transmitted at the same MCS level as before receiving the first message, the serving Node B encodes and modulates the data at the same MCS level as before receiving the first message, repeats the modulated data in a plurality of frequency areas, and transmits the repeated data.

20. The wireless network of claim 16, wherein if the data is to be transmitted at the same MCS level as before receiving the first message, the serving Node B encodes and modulates the data at the same MCS level as before receiving the first message, repeats the modulated data using a plurality of different codes, and transmits the repeated data.

21. The wireless network of claim 16, wherein if the data is to be transmitted at the same MCS level as before receiving the first message, the serving Node B encodes and modulates the data at the same MCS level as before receiving the first message, repeats the modulated data in a plurality of different spatial areas, and transmits the repeated data.

* * * * *